United States Patent [19]

Blanchard et al.

[11] Patent Number: 4,752,667

[45] Date of Patent: Jun. 21, 1988

[54] APPARATUS AND PARTICULARLY DUOPLASMATRON USABLE FOR IONIZING A GAS AND PROCESS FOR USING SAID APPARATUS

[75] Inventors: Bruno Blanchard, Saint Martin le Vinoux; Pierre Juliet, Grenoble, both of France

[73] Assignee: Commissariat a l'Energie Atomique, Paris, France

[21] Appl. No.: 29,886

[22] Filed: Mar. 25, 1987

[30] Foreign Application Priority Data

Apr. 9, 1986 [FR] France ................................ 86 05064

[51] Int. Cl.[4] ................................................ B23K 9/00

[52] U.S. Cl. ...................... 219/121 PR; 219/121 PW; 219/121 PM; 313/581; 313/162; 315/344

[58] Field of Search ................. 219/121 PM, 121 PR, 219/75, 121 PT, 121 PV, 121 PP, 121 P, 121 PW; 313/161, 359.1, 162, 581; 315/111.41, 344, 338

[56] References Cited

U.S. PATENT DOCUMENTS

| | | | |
|---|---|---|---|
| 3,164,739 | 1/1965 | Werner | 313/161 |
| 3,513,351 | 5/1970 | Kelly | 313/161 |
| 3,705,998 | 12/1972 | Jennings et al. | 313/161 |
| 4,596,945 | 6/1986 | Schumacher et al. | 313/161 |
| 4,659,899 | 4/1987 | Welkie et al. | 219/121 PR |

FOREIGN PATENT DOCUMENTS 1243483 8/1971 United Kingdom .

OTHER PUBLICATIONS

Instrument and Experimental Techniques; vol. 27, No. 1: A. L. Pivovarov et al.: "A Duoplasmatron Containing a Wien Filter for Examining the Surfaces of Solids".

*Primary Examiner*—M. H. Paschall
*Attorney, Agent, or Firm*—Kerkam, Stowell, Kondracki & Clarke

[57] ABSTRACT

The invention relates to an apparatus usable for ionizing a gas comprising a cathode serving as a hot or cold cathode and to a process for using this apparatus. The apparatus includes a facing cathode and anode, the gas to be ionized successively traversing the cathode and the anode. The apparatus is characterized in that the cathode is formed by a first and second cylindrical half-electrode in face-to-face relation, the gas to be ionized passing between the half-electrode and a conductive filament connected by a first end to the first half-electrode and by a second end to the second half-electrode and located between the half-electrodes. The invention applied to all apparatuses used for ionizing a gas, such as electric arcs, unoplasmatrons and duoplasmatrons.

8 Claims, 1 Drawing Sheet

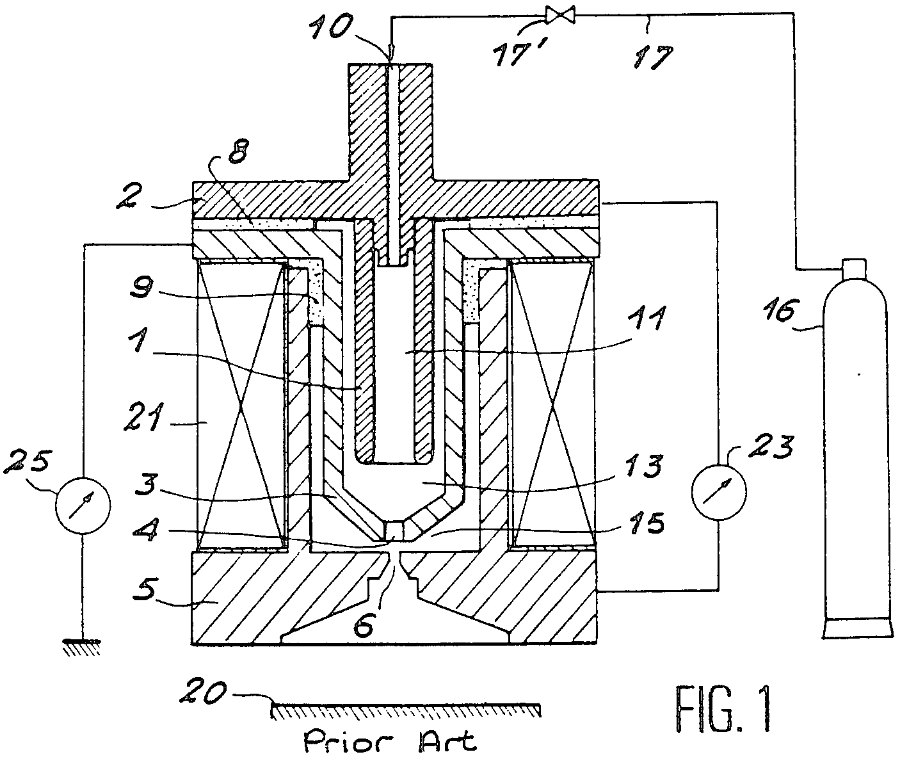
FIG. 1
FIG. 3
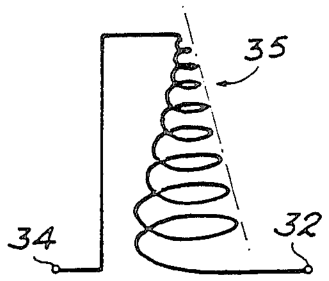
FIG. 2
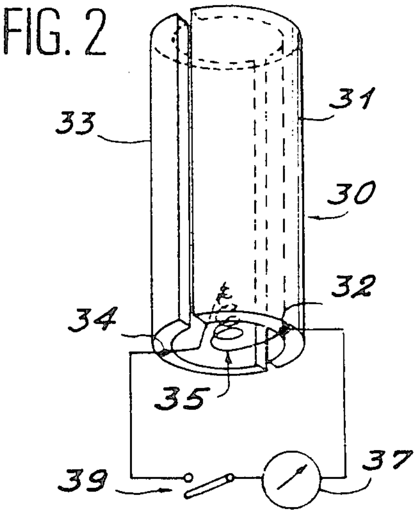

APPARATUS AND PARTICULARLY DUOPLASMATRON USABLE FOR IONIZING A GAS AND PROCESS FOR USING SAID APPARATUS

BACKGROUND OF THE INVENTION

1. Field Of The Invention

The present invention relates to an apparatus usable for ionizing a gas and comprising a cathode serving as a hot or cold cathode as well as to a process for using said apparatus.

The invention applies to all apparatuses used more particularly for ionizing a gas, such as electric arcs, unoplasmatrons and duoplasmatrons. For reasons of clarity of the description, the invention will be described on the basis of a duoplasmatron, e.g. used in surface analysis equipment as an ion source for abrading samples. In known manner, a duoplasmatron comprises either a cold cathode, or a hot cathode.

2. Background Of The Invention

FIG. 1 diagrammatically shows in longitudinal section a cold cathode duoplasmatron of a known type. this duoplasmatron comprises a cylindrical hollow cathode 1, whose upper part is mounted on a generally conductive support 2, an intermediate electrode 3 surrounding cathode 1 and having in its lower part an opening 4 and an anode 5 surrounding the intermediate electrode 3 and provided with an outwardly divergent opening 6 facing the opening 4 of said electrode.

In general, the cathode is made from nickel and the intermediate electrode 3 and anode 4 are made from soft iron.

The terms "upper part" and "lower part" of each element are defined in this text relative to the displacement direction of the gas to be ionized through the duoplasmatron.

Cathode 1 mounted on support 2, intermediate electrode 3 and anode 5 are electrically insulated. These three components are located within one another so as to define three intercommunicating chambers 11, 13, 15, joints 8, 9 ensuring the sealing of said chamber with the exterior. Chamber 11 is defined by the inner cylindrical walls of the cathode, chamber 13 by the space between cathode 1 and intermediate electrode 3 and chamber 15 by the space defined between intermediate electrode 3 and anode 5.

Moreover, a magnetic coil 21 surrounds chambers 11, 13, 15. This coil is located around the upper part of anode 5 and rests both on the lower part of anode 5 and the upper part of intermediate electrode 3.

Moreover, a voltage generator 23, e.g. connected to the lower part of anode 5 and to the conductive support 2 of cathode 1 makes it possible to apply a potential difference Va-vc of approximately 300 to 500 V between the anode and the cathode, Va representing the voltage applied to the anode and Vc the voltage applied to the cathode. Moreover, a voltage generator 25 is connected to the intermediate electrode, e.g. to the upper part of said electrode and to ground. Voltage generator 25 makes it possible to apply a voltage Vi to the intermediate electrode, said voltage Vi being generally such that $Vi=(Va-Vc)/2$. Voltage Vi can also be obtained from the voltage generator 23 via a divider bridge connected to the intermediate electrode and to the voltage generator 23 and in this case generator 25 is eliminated.

Not shown vacuum forming means, such a vacuum pump, ensure the discharge, e.g. via opening 6 of all gases present in chambers 11, 13 and 15 prior to the introduction of the gas to be ionized into the duoplasmatron.

The gas to be ionized is e.g. stored in a cylinder 16 connected by a pipe 17 to support 2 of cathode 1, said support having a passage 10 connected to chamber 11. Opening and closing means, such as a valve 17' e.g. located on pipe 17 makes it possible to introduce a regulated gas flow into the duoplasmatron from cylinder 16.

The remainder of the description makes it possible to understand the operation of the cold cathode duoplasmatron.

Before forming a vacuum in chambers 11, 13 and 15, gas is introduced into the duoplasmatron by opening valve 17'. The gas circulates in chamber 11, where it will be ionized by the electrons emitted by cathode 1, to which potential Vc is applied. A plasma of ions and electrons then forms and will be moved toward the intermediate electrode 3 by the electric field $\vec{E}_1$ induced by the potential difference $Vi-Vc$ between cathode 1 and electrode 3. This plasma will pass through the opening 4 moved by an electric field $\vec{E}_2$ induced by the potential difference Va-Vi between electrode 3 and anode 5, as well as by a magnetic field $\vec{H}$ between electrode 3 and anode 5.

Field H circulates in a closed loop between magnetic coil 21, intermediate electrode 3 on which the coils rests, the part of chamber 15 defined between the lower part of the intermediate electrode 3 and the upper part of anode 5 and finally anode 5, on which the magnetic coil also rests.

Thus, the plasma is defined by the electric field $\vec{E}_2$ and the magnetic field $\vec{H}$ between the intermediate electrode 3 and anode 5. This plasma then passes through the opening 6 made in anode 5, moved by an electric field $\vec{E}_3$ induced by the potential difference between the anode and the generally grounded surface 20 to be abraded. These electric and magnetic fields $\vec{E}_1$, $\vec{E}_2$, $\vec{E}_3$ and $\vec{H}$ have the same direction and sense as the gas flow.

In order to function as a hot cathode, this duoplasmatron must be disassembled and the cylindrical cathode 1 replaced by a filament helically wound in accordance with a cylinder, whose axis is perpendicular to the gas flow direction. This filament is connected by each of its ends to a separate conductive tab or clip mounted on support 2, the gas to be ionized passing between said tabs and through the filament.

As hereinbefore, voltages Vc, Va and Vi are respecitvely applied to support 2, anode 5 and intermediate electrode 3. Moreover, a voltage Vs is applied between the two ends of the filament by a voltage generator. Said voltage Vs permits the flow of a current I in the filament and consequently the heating of the filament by the Joule effect.

For a cold cathode, the electron emission is more particularly produced by the bombardment thereof by the ions and electrons of the plasma. Thus, this emission is dependent on the conditions prevailing in the duoplasmatron, such as the pressure, electric fields and the nature of the gas. The electron emission of a hot cathode, due to the heating of the filament, in particular determined by its temperature and therefore the intensity of the current I, which can easily be regulated. Thus, the hot cathode permits a more stable electron emission, whereof it is possible to regulate the generally higher intensity than that supplied by a cold cathode.

Therefore, when functioning as a hot cathode, a potential difference Va−Vc of a few dozen volts is adequate.

As a function of the type of gas to be ionized, it may be more advantageous to use either a cold cathode or a hot cathode. The cold cathode is used with reactive gases such as oxygen, which would attack a filament (hot cathode), whereas for inert gases such as argon, xenon, etc, it is more advantageous to use a hot cathode. Thus, the hot cathode makes it possible for the duoplasmatron to operate with a lower pressure of approximately $10^{-4}$ Pa and, as the electron emission for ionizing the gas is more stable, gives a better stability of the stream of ions extracted.

With a known duoplasmatron, for passing from hot cathode operation to cold cathode operation, it is necessary to disassemble the duoplasmatron, which makes it necessary to stop the operation thereof and break the vacuum.

SUMMARY OF THE INVENTION

The object of the present invention is to obviate these disadvantages by providing an apparatus usable for ionizing a gas operating either in cold or hot cathode manner without any disassembly of the apparatus.

The invention specifically relates to an apparatus usable for ionizing a gas comprising a facing cathode and anode, the gas to be ionized successively traversing the cathode and the anode, wherein the cathode is formed from first and second facing electrodes, the gas to be ionized passing between the said electrodes and a conductive filament connected by a first end to the first electrode and by a second end to the second electrode and located between said electrodes.

Advantageously, the first and second electrodes are facing semicylinders so as to form a cylinder slit along two opposite generatrixes and the filament is connected to the outlet ends for the gas to be ionized of the first and second electrodes.

Preferably, the filament is helically wound in accordance with a cone, whose axis coincides with the longitudinal axis of the cylinder produced by the first and second electrodes, the gas to be ionized traversing said cone from its apex. This cone has an apex angle e.g. ranging between 7° and 15°.

According to a preferred embodiment of the invention, the first and second electrodes are made from titanium and the filament from tantalum.

The invention also relates to a duoplasmatron comprising an apparatus of the type described hereinbefore.

The invention also relates to a process for using the apparatus usable for ionizing a gas, wherein with the apparatus functioning as a cold cathode, a potential difference is applied between the anode and the first and second electrodes.

According to a variant of the process for using the apparatus usable for ionizing a gas and with it functioning as a hot cathode, a first potential difference is applied between the anode and the first and second electrodes and a second potential difference is applied between the first and second ends of the filament.

BRIEF DESCRIPTION OF THE DRAWINGS

The invention is described in greater detail hereafter relative to non-limitative embodiments and the attached drawings, wherein show:

FIG. 1, already described, diagrammatically and in longitudinal section a known cold cathode duoplasmatron.

FIG. 2, diagrammatically a cathode according to the invention usable as a cold or hot cathode.

FIG. 3, the filament of the cathode according to the invention helically wound in the form of a cone.

DETAILED DESCRIPTION OF THE PREFERRED EMBODIMENTS

Cathode 30 shown in FIG. 2 is constituted by two facing electrodes 31, 33 and a conductive filament 35 connected by one of its ends 32 to electrode 31 and by its other end 34 to electrode 33.

The two electrodes 31, 33 are respectively constituted by a facing semicylinder, so as to form a cylinder slit along two opposite generatrixes, the gas to be ionized traversing said cylinder. For example, said cylinder has a diameter of 40 mm and a length of 70 mm.

The filament 35 is helically wound (cf FIG. 3) to form a cone having an apex angle between 7° and 15° and a length of e.g. 15 mm. This filament is located at the outlet ends for the gas of the first and second electrodes and it is traversed by the gas as from the apex of the cone which it forms. The two electrodes are preferably made from titanium. Thus, titanium makes it possible to obtain a purer ion beam than the nickel used in the prior art.

Moreover, the filament is advantageously made from tantalum, which has a 5 to 10 times longer life than that of a tungsten filament used under the same conditions. Thus, the wear to the filament is essentially due to cathodic sputtering and the cathodic sputtering of tungsten is greater than that of tantalum. Moreover, as the resisitivity of tantalum is higher than that of tungsten, a filament with a diameter of approximately 0.7 mm is used, instead of 0.5 mm for a prior art tungsten filament.

The axis of the cone constituted by the filament coincides with the longitudinal axis of the cylinder produced by the two electrodes 31, 33. This special arrangement also makes it possible to increase the life of the filament by a factor of approximately 4 to 5.

Thus, for example, for a tantalum filament traversed by xenon, which is a gas having a very high sputtering rate, the filament life exceeds one month.

In addition, a voltage generator 37 and a switch 39 arranged in series are connected between the two filament ends.

If this cathode 30 is used in a duoplasmatron, it is mounted on support 2 of FIG. 1 in place of cathode 1. The lower part of electrodes 31 and 33 is connected to filament 35.

The first and second electrodes and the support are preferably made in one piece, but obviously the first and second electrodes can be joined to the support. This support is advantageously also made from titanium.

A potential difference Va−Vc is applied between electrodes 31, and 33 and anode 5 by voltage generator 23 and a voltage Vi is applied, as hereinbefore, to the intermediate electrode 3.

When switch 39 is off, a voltage Vs is applied to the ends of the filament by generator 37. In this case, the duoplasmatron functions as a hot cathode. Thus, the filament traversed by a current gives off heat by the Joule effect. This filament then emits electrons, which will ionize gas atoms. The ions formed will be confined, in the manner described hereinbefore, in the electric and magnetic fields before being extracted from the duoplasmatron.

The potential difference Va-Vc applied between the first and second electrodes and the anode is a few dozen volts, the voltage Vc applied between the two ends of the filament is roughly a few 0.1 volt and the current flowing in the filament is a few amperes.

When operating as a hot cathode, the electrodes are essentially emitted by the filament. The quantity of electrons emitted by the first and second electrodes is very small, due to the small potential difference Va−Vc.

When switch 39 is on, the voltage applied to filament 35 is zero and no current flows in the filament. The plasmatron consequently functions as a cold cathode. In this case, in order that the first and second electrodes emit sufficient electrons to ionize the gas, a potential difference Va−Vc of approximately 300 to 500 V is applied between the anode and the first and second electrodes.

The use of a cathode according to the invention serving as a hot or cold cathode in a duoplasmatron has been described, but obviously the invention applies to all ion sources using a cold or hot cathode.

Moreover, the electrical devices associated with the duoplasmatron and in particular the aforementioned cathode are highly simplified and other more complex devices can be used without passing beyond the scope of the invention.

What is claimed is:

1. An apparatus usable for ionizing a gas comprising a facing cathode and anode, the gas to be ionized successively traversing the cathode and the anode, wherein the cathode is formed from first and second semicylinders which face one another to form a cylinder slit along two opposite edges, the gas to be ionized passing between the said semicylinder electrodes and a conductive filament connected by a first end to the first semicylinder electrode and by a second end to the second semicylinder electrode and located between said semicylinder electrodes.

2. An apparatus according to claim 1, wherein the filament is connected to the outlet ends for the gas to be ionized of the first and second electrodes.

3. An apparatus according to claim 2, wherein the filament is helically wound to form a cone, whose axis coincides with the longitudinal axis of the first and second electrodes, the gas to be ionized traversing said cone from its apex.

4. An apparatus according to claim 3, wherein the cone has an apex angle of 7° to 15°.

5. An apparatus according to claim 1, wherein the first and second electrodes are made from titanium.

6. An apparatus according to claim 1, wherein the filament is made from tantalum.

7. An apparatus usable for ionizing a gas according to claim 1, wherein it functions as a cold cathode and a potential difference is applied between the anode and the first and second electrodes.

8. An apparatus usable for ionizing a gas comprising a facing cathode and anode, the gas to be ionized successively traversing the cathode and the anode, wherein the cathode is formed from first and second semicylinders which face one another to form a cylinder slit along two opposite edges, the gas to be ionized passing between the said electrodes and a conductive filament connected by a first end to the first semicylinder electrode and by a second end to the second semicylinder electrode and located between said semicylinder electrodes, wherein the apparatus functions as a hot cathode, a first potential difference being applied between the anode and the first and second semicylinder electrodes and a second potential difference is applied between the first and second ends of the filament.

* * * * *